United States Patent [19]

Louvet

[11] Patent Number: 5,422,481

[45] Date of Patent: Jun. 6, 1995

[54] DEVICE FOR ISOTOPE SEPARATION BY ION CYCLOTRON RESONANCE

[76] Inventor: Pierre Louvet, 30 Rue Parmentier, 91120 - Palaiseau, France

[21] Appl. No.: 242,136

[22] Filed: May 13, 1994

[30] Foreign Application Priority Data

May 26, 1993 [FR] France ................ 93 06305

[51] Int. Cl.$^6$ ............................................ H01J 49/38
[52] U.S. Cl. ..................................... 250/291; 250/283
[58] Field of Search ................. 250/291, 290, 283, 282

[56] References Cited

U.S. PATENT DOCUMENTS

| | | | |
|---|---|---|---|
| 4,059,761 | 11/1977 | Dawson | 250/287 |
| 4,066,893 | 1/1978 | Dawson | 250/282 |
| 4,081,677 | 3/1978 | Dawson | 250/290 |
| 4,093,856 | 6/1978 | Stenzel | 250/293 |
| 4,167,668 | 9/1979 | Mourier | 250/291 |
| 4,208,582 | 6/1980 | Arnush et al. | 250/291 |
| 4,213,043 | 7/1980 | Dawson | 250/283 |
| 4,931,640 | 6/1990 | Marshall et al. | 250/291 |

FOREIGN PATENT DOCUMENTS

| | | |
|---|---|---|
| 0252845 | 1/1988 | European Pat. Off. . |
| 2305221 | 3/1976 | France . |
| 2363364 | 9/1976 | France . |
| 2740272 | 3/1978 | Germany . |
| 2933504 | 2/1981 | Germany . |
| 61-030036 | 2/1986 | Japan . |
| 62-170475 | 7/1987 | Japan . |
| 3012924 | 1/1991 | Japan . |
| 283196 | 1/1965 | Netherlands . |

OTHER PUBLICATIONS

"La Separation Isotopique par Resonance Cyclotronique Ionique", Pierre Louvet, Clefs Cea No. 14 Automne 1989, pp. 30–37.
"Review of Isotope Separation Plasma Processes", Pierre Louvet, Jul. 1989
French Search Report—FA 488931-FR 9306305-Jan. 13, 1994.

*Primary Examiner*—Jack I. Berman

[57] ABSTRACT

Device for isotope separation by ion cyclotron resonance (ICR). This device comprises a vertical enclosure (2), means (6) for producing a homogeneous, vertical magnetic field in said enclosure, a plasma source (8) for producing in the central part of the enclosure an ion plasma of the isotope to be separated, means (10) for producing in the enclosure an electric field perpendicular to the magnetic field and oscillating at the ion cyclotron frequency of the isotope to be separated, which is adjusted as a function of the mass of said isotope, collection means (12) for recovering a mixture which is enriched and a mixture which is depleted with said isotope. The plasma source comprises a container (14) containing the element (20), whose isotope is to be separated and means (18) for ionizing atoms of the element. Application to the separation of the isotopes of gadolinium.

10 Claims, 1 Drawing Sheet

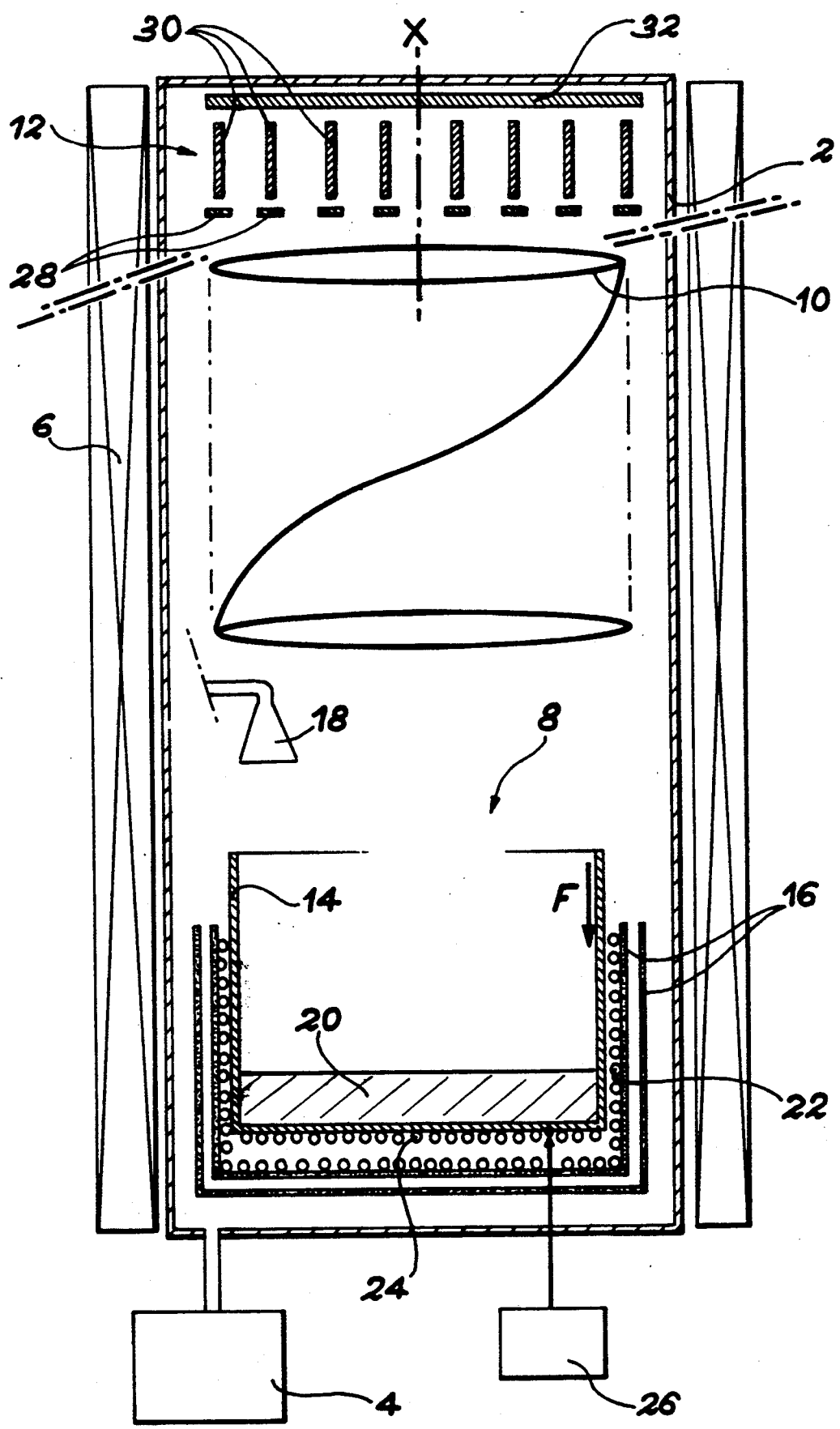

DEVICE FOR ISOTOPE SEPARATION BY ION CYCLOTRON RESONANCE

DESCRIPTION

The present invention relates to a device for isotope separation by ion cyclotron resonance, said device comprising:
- a tight enclosure having an elongated shape in one direction,
- means for forming a vacuum in said enclosure,
- means for producing a homogeneous magnetic field in the central part of the enclosure and parallel to said direction,
- a plasma source for producing in the enclosure a plasma containing ions of the isotope to be separated,
- means for producing in the central part of the enclosure an electric field perpendicular to the magnetic field and oscillating at a frequency close to the ion cyclotron frequency of the isotope to be separated, which is adjusted as a function of the mass of said isotope to be separated and
- collection means for recovering on the one hand a mixture enriched with said isotope and on the other a mixture depleted with said isotope.

The invention more particularly applies to the separation of stable isotopes of metal ions. It is of interest to separate these isotopes both for research applications (in nuclear physics and chemistry) and for medical applications (therapy and diagnosis).

The invention applies inter alia to the separation of the isotopes of metals such as zinc, cadmium, tin, calcium and more particularly gadolinium.

In general terms, the invention is particularly suitable for the separation of isotopes of metal elements, whose melting point is sufficiently low to permit a liquid reflux and a Joule effect evaporation, i.e. where the melting point does not exceed approximately 1500° C. and whereof also the vapour pressure is adequate (at least approximately $10^{-3}$ Pa) at or close to said temperature.

If the melting point of the metal on which isotope separation is to be carried out is too high (e.g. exceeding 1500° C.), it is possible to use an alloy of said metal which has a lower melting point and whose vapour pressure is adequate.

The plasma source of the device according to the invention is appropriate for such elements.

The device according to the invention is also able to treat, in a special embodiment, elements which sublimate (particularly zinc, ytterbium and calcium).

The invention does not suffer from the disadvantages of isotope separation devices using ultracentrifuging, which can only be used with elements having a gaseous compound which is stable, non-corrosive close to ambient temperature and whose associated atoms (other than those of the element to be separated) only contain a single isotope, which in practice excludes a relatively large number of elements.

The invention also does not suffer from the disadvantages of electromagnetic isotope separation devices known as calutrons, which have an excessively low production rate and an excessively high energy consumption and therefore a prohibitive effect on production.

Ion cyclotron resonance isotope separation devices are already known from the following documents:

FR-A-2,305,221,
FR-A-2,363,364
U.S. Pat. No. 4,059,761,
U.S. Pat. No. 4,066,893,
U.S. Pat. No. 4,081,677,
U.S. Pat. No. 4,093,856
U.S. Pat. No. 4,208,582,
U.S. Pat. No. 4,213,043,

PCT/US 83/00050 filed on 13.1.1983 and published on 19.7.1984 under No. WO84/02803, Article by P. LOUVET entitled "Review of isotope separation plasma processes", Contribution to the second workshop on separation phenomena in liquids and gases, Versailles (France), Jul. 10 to 12 1989.

The present invention aims at obtaining a better use of the material used for isotope separation, a greater charging of said material and a longer production cycle not possible with the known ion cyclotron resonance isotope separation devices.

To this end, the device according to the invention is characterized in that the enclosure is positioned in a vertical direction and therefore has a so-called lower part and a so-called upper part, the magnetic field then being vertical, in that the collection means are placed in the upper part of the enclosure and in that the plasma source is placed in the lower part of the enclosure and comprises:
- an electrically conductive container having an opening facing the upper part of the enclosure and which contains the element whose isotope is to be separated, said container being provided so that at least its outer part remains solid during the operation of the device,
- means for ionizing atoms of the element and
- maintaining means, which maintain during said operation part of the content of the container in the vicinity of its bottom at an operating temperature able to bring about the melting of the element or its sublimation, whilst leaving the upper part of the container at a temperature below the melting point of the element.

Therefore the device according to the invention is positioned vertically and is able to ensure a vertical liquid reflux and the intrinsic obtaining of a good utilization of the material intended for the isotope separation, the use coefficient being close to 1 and without prejudicing the isotope separation performance characteristics.

The invention also makes it possible to increase the charging with such material and to lengthen the production cycle.

The invention also leads to significant energy economies in the plasma source compared with the known ion cyclotron resonance isotope separation devices.

The temperature of the ions is also lower with the plasma source used in the present invention than with sputtering sources, so that a better separating effect is obtained.

The magnetic field should be sufficiently intense to confine the plasma, limit the length of the enclosure (and consequently the harmful effect of Coulombian collisions) and obtain the desired separating effect. Its value, which can be 1 to 5T, is a function of the elements to be separated. It becomes higher as the molar mass of the element to be separated becomes heavier and the mass difference between the isotopes of said element becomes lower. For this reason use is preferably made of a superconducting coil for producing said magnetic field.

According to a preferred embodiment of the device according to the invention, the means for producing the magnetic field incorporate a magnetic coil, which surrounds the enclosure and the container is shaped like a cylinder of revolution about the axis of the coil. This shape makes it possible to respect the symmetry of the magnetic field produced.

According to a special embodiment of the device according to the invention, the container is made from an amagnetic, electrically conductive material, whose melting point exceeds the operating temperature.

According to another special embodiment, the element whose isotope is to be separated is a metal, so that the container is made from said metal or an alloy thereof and has an adequate thickness for its outer part to remain at a temperature below the melting point of the element or the alloy during the operation of the device.

In a particular embodiment of the invention, the maintaining means are heat shields, which are made from amagnetic materials and surround the container with the exception of the upper part thereof. These shields also permit energy economies.

The device according to the invention can also comprise means for heating the container. Said device can also comprise means for heating the container bottom.

The device can also comprise means for the negative polarization of the container.

The invention more particularly applies to the isotope separation of a metal, the container containing said metal or an alloy of said metal, whose saturated vapour pressure is between $10^{-3}$ and 10 Pa at a temperature slightly above the melting point of the metal or the alloy.

The invention also applies to the isotope separation of a metal sublimating with a saturated vapour pressure between $10^{-3}$ and 10 Pa and at a temperature below 1500° C.

The present invention will be better understood from reading the following description of exemplified embodiments given in a non-limitative manner and with reference to the single drawing. The drawing is a diagrammatic sectional view of a special embodiment of the device according to the invention permitting the isotope separation of a metal, e.g. gadolinium.

The device diagrammatically shown in FIG. 1 comprises:
- a vertically positioned, elongated tight enclosure 2,
- pumping means 4 for forming the vacuum in said enclosure 2,
- a vertical superconducting coil 6, whose axis carries the reference X in the drawing and which produces a homogeneous magnetic field along the axis X in the central area of the container 2 (area in which the separation is to take place), said coil being controlled by not shown means,
- a plasma source 8 for producing in the enclosure a plasma containing ions of the isotope of the metal whose isotope separation is to be performed, said source being placed in the lower part of the enclosure, in the divergent part of the magnetic field,
- means 10 for producing in the central part of the enclosure an electric field perpendicular to the magnetic field and oscillating at a frequency close to the ion cyclotron frequency of the isotope to be separated and which is adjusted as a function of the mass of said isotope to be separated and
- collection means 12 for recovering on the one hand a mixture enriched with said isotope and on the other a mixture depleted of said isotope.

The collection means 12 are placed in the upper part of the enclosure.

The plasma source 8 comprises an electrically conductive container 14, which is open facing the upper part of the enclosure and which is intended to contain the metal whose isotope is to be separated. The container 14 is shaped like a cylinder of revolution, whose axis is the axis X of the coil 6.

With a view to maintaining the metal in the vicinity of the bottom of the container containing it at a temperature above the melting point of said metal, whilst leaving the upper part of the container 14 at a temperature below said melting point, heat shields 16 surround the container 14, except in its upper part.

The plasma source also comprises means 18 for ionizing atoms of the metal.

In order to permit a good isotope separation, the magnetic field produced appropriately has a high homogeneity in the area where the separation is to take place (area occupied by the means 10), which is well above the relative variation of the masses of the isotopes of the metal.

The metal to be separated is brought into the form of one or more ingots 20 in the container 14, said ingot or ingots preferably covering the entire bottom of the container. The container 14 is made from an amagnetic metal, whose melting point is above that of the metal to be separated.

As a variant, said container can be made from the metal to be separated, the container then having an adequate thickness to ensure that the outer part of the container remains at a temperature below the melting point of the metal.

The enclosure 2 is made from an amagnetic material and is grounded.

The heat shields 16 are e.g. made from an amagnetic refractory metal such as tantalum for the hottest of them, whereas the others can be made from an amagnetic stainless steel.

The energy necessary for maintaining a high temperature on the side walls of the container 14, where there is a metal reflux, is supplied by the edge plasma and the arrival of fast particles.

It should be noted that the device shown in the drawing can be started up in a natural manner. However, conventional, Joule effect preheating means 22 can be used at the start of the formation of the plasma, but are subsequently disconnected so as to not prejudice the homogeneity of said plasma.

These preheating means 22 are e.g. constituted by heating windings controlled by not shown means and surrounding that part of the container 14 which is placed in the heat shields 16.

As can be seen in the drawing, the upper part of the container 14, which is not located in the heat shields, is not provided with heating windings (this part, which is colder than the remainder of the container, corresponding to a metal condensation area).

The device shown in the drawing can be provided with means 24 for heating the bottom of the container 14 with a view to maintaining, during the use of the device, a temperature at the bottom of the container which is above the temperature of the container side walls, such a heating of the container bottom being less harmful, due to the location of said heating, for the homogeneity of the magnetic field (which can exceed $5 \times 10^{-4}$ in the case of gadolinium).

In the embodiment shown, the heating means 24 are constituted by Joule effect heating windings, as can be seen in the drawing. The control means for said Joule effect heating windings are not shown. These windings may be harmful to the homogeneity of the magnetic field in the separation area.

To reduce this risk to the minimum, it is merely necessary to use bifilar windings, whose two wires are respectively traversed by currents of the same intensity, but opposite sense, so that the magnetic field produced by the said windings is virtually zero.

The lowest value of the temperature in the upper part of the container 14, which can be 100° C. below that of the melting point of the ingot 20, makes it possible to avoid any rise of the metal in the container. The temperature of the ingot 20 is regulated so as to evaporate it at a pressure between approximately $10^{-3}$ and 10 Pa. The temperature should be approximately 1370° C. in the case of gadolinium. The thus formed metal vapour is then ionized by means 18, which are electron cyclotron resonance ionization means. These means produce an ultra-high frequency wave, which heats the electrons and the latter then gain energy, which enables them to ionize the neutral atoms of the vapour formed.

The ionization efficiency is not equal to 1 and the unionized metal atoms are deposited on the side walls of the container 14. They reevaporate or participate in the liquid reflux symbolized by the arrow F in the drawing and redescend towards the bottom of the container 14 and are subsequently reevaporated.

The ions formed have a temperature close to that of the neutral atoms from which they come and which is approximately 0.15 eV. This low temperature makes it possible to obtain a very high separation factor.

In the case where the saturated vapour pressure is inadequate or is close to the liquefaction point of the metal ingot 20, it is possible to increase the neutral atom rate by grounding the container 14 or raising said container 14, by appropriate polarization means 26, to a negative potential compared with the enclosure.

Thus, the walls of said container 14 are then rapidly covered with a liquid metal layer (or a solid layer of said metal in the case of a metal which sublimates) and this layer is then sputtered by ions of the plasma and reemits neutral atoms.

One of the most interesting uses of the device shown in the drawing is the isotope separation of gadolinium, which has a melting point of 1313° C.

As gadolinium is a very poor heat conductor, it is possible to use a container made either from molybdenum or from gadolinium, then ensuring a thickness of at least 3 cm, so that it is ensured that the container has a solid part of adequate thickness.

The temperature of the container bottom is regulated to about 1370° C., so that the saturated vapour pressure is between $10^{-1}$ and 10 Pa.

The poor heat conductivity of gadolinium requires no heating after an ignition phase, the thermal energy being supplied by the losses of the ultra-high frequency ionization means 18.

The ultra-high frequency wave, whose frequency is approximately 37 to 110 GHz, for obtaining the ionization of the gadolinium vapour is produced in conventional manner by a gyrotron and is introduced into the enclosure by an antenna in the quasi-optical mode in order to produce a maximum homogeneous plasma, whose density is approximately $10^{12}$ particles/cm$^3$.

The wave can be introduced in quasi-parallel manner to the magnetic field produced by the coil 6, so as to have the maximum absorption efficiency, in the area where the frequency of the wave is close to the electron cyclotron frequency.

The absorption mode of the wave is preferably the extraordinary mode, i.e. a mode in which the electric field of the wave is perpendicular to the magnetic field produced by the coil 6 and to the wave propagation vector.

Another, not shown possibility is to introduce the wave perpendicular to the magnetic field created by the coil.

In order to obtain a good homogeneity of the plasma, it is then appropriate to use multiple reflections on the walls of the plasma source in order to prevent the ultra-high frequency wave emitted by the antenna from directly penetrating the area where the electrons are heated by electron cyclotron resonance and are not violently absorbed, thus creating a high radial density gradient.

In conventional manner, the antenna 18 can be in horn form, or can be a rectangular guide surrounding the plasma and provided with radiative slits, or can be a system known as a Vlasov Feeder associated with a mirror.

For information purposes, the magnetic field produced by the coil is approximately 3 to 5T, the diameter of the magnetic coil 6 is approximately 1.3 m and the length of said coil where the magnetic field is homogeneous is approximately 5 m.

The device shown in the drawing can also be used with a metal element to be separated, which sublimates. In this case, the heat shields maintain a vapour pressure of the neutral atoms e.g. around 1 Pa. The nonreevaporated atoms can then periodically reflux with the aid of heating means 22.

It is pointed out that the means 10 for producing the oscillating electric field comprise a helical antenna, which is cooled by not shown means and in which is made to circulate an intense current by means of not shown exciting means, so as to produce an electromagnetic wave, whose frequency is close to, but different from (due to the Doppler effect) the ion cyclotron resonance frequency of the selected isotope.

The collection means 12 in the upper part of the enclosure 2 comprise:

means 28 known as fences, which are made from tantalum and whose width is approximately 1 to 6 mm, said fences being cooled by radiation and facilitate the fixing of the potential on the plates 30 by collecting an electron current and preventing undesirable isotopes from being collected by said plates 30, plates 30 placed behind the fences and parallel to the axis X for collecting the mixture rich in the isotope to be separated and known as sieves, which are made from graphite or tantalum and cooled by radiation and also conduction, by means of not shown supports which are cooled with water, said plates 30 being raised to a negative potential by not shown polarizing means and a plate 32 located at the end of the sieves for collecting the mixture depleted of the isotope to be separated, made from stainless steel or copper and cooled by a not shown water circulation on its rear part, being electrically insulated from the enclosure and raised to a potential close to the potential of the plasma in order to prevent the sputtering of said plate 32 and the atoms which it collects.

I claim:

1. Device for isotope separation by ion cyclotron resonance, said device comprising:
   a tight enclosure (2) having an elongated shape in one direction,
   means (4) for forming a vacuum in said enclosure,
   means (6) for producing a homogeneous magnetic field in the central part of the enclosure and parallel to said direction,
   a plasma source (8) for producing in the enclosure a plasma containing ions of the isotope to be separated,
   means (10) for producing in the central part of the enclosure an electric field perpendicular to the magnetic field and oscillating at a frequency close to the ion cyclotron frequency of the isotope to be separated, which is adjusted as a function of the mass of said isotope to be separated and
   collection means (12) for recovering on the one hand a mixture enriched with said isotope and on the other a mixture depleted with said isotope,
   characterized in that the enclosure (2) is positioned in a vertical direction and therefore has a so-called lower part and a so-called upper part, the magnetic field then being vertical, in that the collection means (12) are placed in the upper part of the enclosure and in that plasma source (8) is placed in the lower part of the enclosure and comprises:
   an electrically conductive container (14) having an opening facing the upper part of the enclosure and which contains the element (20) whose isotope is to be separated, said container being provided so that at least its outer part remains solid during the operation of the device,
   means (18) for ionizing atoms of the element and
   maintaining means (16), which maintain during said operation part of the content of the container in the vicinity of its bottom at an operating temperature able to bring about the melting of the element or its sublimation, whilst leaving the upper part of the container at a temperature below the melting point of the element.

2. Device according to claim 1, characterized in that the means for producing the magnetic field comprise a magnetic coil (6), which surrounds the enclosure (2) and in that the container (14) is shaped like a cylinder of revolution around the axis (X) of the coil (6).

3. Device according to claim 1, characterized in that the container (14) is made from an electrically conductive, amagnetic material, whose melting point is above the operating temperature.

4. Device according to claim 1, characterized in that the element whose isotope is to be separated is a metal and in that the container (14) is made from said metal or an alloy of said metal and has an adequate thickness so that its outer part remains at a temperature below the melting point of the element or alloy during the operation of the device.

5. Device according to claim 1, characterized in that the maintaining means are heat shields (16) made from amagnetic materials and which surround the container (14), except in the upper part thereof.

6. Device according to claim 1, characterized in that it also comprises means (22) for heating the container (14).

7. Device according to claim 1, characterized in that it also comprises means (24) for heating the bottom of the container (14).

8. Device according to claim 1, characterized in that it also comprises means (26) for the negative polarization of the container (14).

9. Application of the device according to claim 1 to the isotope separation of a metal, the container containing said metal or an alloy of said metal, whose saturated vapour pressure is between $10^{-3}$ and 10 Pa at a temperature slightly above the melting point of the metal or alloy.

10. Application of the device according to claim 1 to the isotope separation of a metal, which sublimates with a saturated vapour pressure between $10^{-3}$ and 10 Pa and at a temperature below 1500° C.

* * * * *

UNITED STATES PATENT AND TRADEMARK OFFICE
CERTIFICATE OF CORRECTION

PATENT NO. : 5,422,481
DATED : June 6, 1995
INVENTOR(S) : Pierre Louvet

It is certified that error appears in the above-indentified patent and that said Letters Patent is hereby corrected as shown below:

On the title page: Item [73] Assignee should be inserted with respect to the assignee: -- Commissariat À L'Energie Atomique, Paris, France and Compagnie Generale Des Matieres Nucleaires, Velizy Villacoublay, France--.

On the title page: Item [56] should be inserted with respect to Attorney, Agent or Firm: -- Pearne, Gordon, McCoy & Granger--.

Signed and Sealed this

Ninth Day of January, 1996

Attest:

BRUCE LEHMAN

Attesting Officer

Commissioner of Patents and Trademarks